United States Patent [19]

Seki et al.

[11] Patent Number: 4,999,765
[45] Date of Patent: Mar. 12, 1991

[54] METHOD OF CREATING NC DATA FOR GROOVING

[75] Inventors: Masaki Seki, Tokyo; Koji Samukawa; Osamu Hanaoka, both of Yamanashi, all of Japan

[73] Assignee: Fanuc Ltd., Minamitsuru, Japan

[21] Appl. No.: 320,092

[22] PCT Filed: Jul. 20, 1988

[86] PCT No.: PCT/JP88/00723
§ 371 Date: Mar. 7, 1989
§ 102(e) Date: Mar. 7, 1989

[87] PCT Pub. No.: WO89/01196
PCT Pub. Date: Feb. 9, 1989

[30] Foreign Application Priority Data
Jul. 30, 1987 [JP] Japan ................... 62-191373

[51] Int. Cl.$^5$ ............................................. G06F 15/46
[52] U.S. Cl. ................................. 364/191; 364/474.29; 364/474.32
[58] Field of Search ............... 364/191, 474.01, 474.18, 364/474.28, 474.29, 474.32; 318/569

[56] References Cited
U.S. PATENT DOCUMENTS

| | | | |
|---|---|---|---|
| 4,689,750 | 8/1987 | Kishi et al. | 364/474.33 |
| 4,703,415 | 10/1987 | Kishi et al. | 364/474.32 |
| 4,704,687 | 11/1987 | Kishi et al. | 364/474.32 |
| 4,905,158 | 2/1990 | Seki et al. | 364/191 |

Primary Examiner—Jerry Smith
Assistant Examiner—Paul Gordon
Attorney, Agent, or Firm—Staas & Halsey

[57] ABSTRACT

A method of creating NC data for grooving, a unit normal vector (N) at the position (Pe) of a grooving end point is obtained after creation of NC data for grooving, a movement vector (D) is obtained by multiplying a designated movement distance (da) by the unit normal vector (N), and NC data for withdrawal are created for moving a tool (TL), by the amount of the movement vector (D), from the position (Pe) at which grooving ends.

8 Claims, 4 Drawing Sheets

METHOD OF CREATING NC DATA FOR GROOVING

DESCRIPTION

1. Technical Field

This invention relates to a method of creating NC data for grooving. More particularly, the invention relates to a grooving NC data creation method through which NC data are created for cutting a groove in a three-dimensional curved surface and withdrawing a tool from the three-dimensional curved surface by a designated distance at the end of grooving.

2. Description of Background Art

In grooving a curved surface by, for example simultaneous five-axis control, it is required at the end of grooving to withdraw the tool from the position at which cutting ends. To this end, the conventional practice is for the operator to designate during creation of NC data a withdrawal point or a withdrawal distance in which the +Z axis is taken as the withdrawal axis. This NC data is created in such a manner that the tool is withdrawn to the designated withdrawal point or the designated withdrawal distance along the +Z axis.

However, when determining a withdrawal point in an arbitrary direction or a withdrawal point at a position that is a designated distance in the +Z direction, a problem that arises is that the tool cuts away a portion of the curved surface of the article at withdrawal. FIG. 8 illustrates a case in which a tool TL is withdrawn from a grooving end point Pe a withdrawal distance f in the +Z direction. At withdrawal, the shaded portion of the three-dimensional curved surface SS is cut away.

SUMMARY OF THE INVENTION

Accordingly, an object of the present invention is to provide a grooving NC data creation method which makes it possible to simply create NC data which will not cause the curved surface of an article to be cut away at withdrawal of a tool.

In a method of creating NC data for grooving according to the present invention, a unit normal vector at the position of a grooving end point is obtained after creation of NC data for grooving, a movement vector is obtained by multiplying a designated movement distance by the unit normal vector, and NC data for withdrawal are created for moving a tool, by the amount of the movement vector, from the position at which grooving ends.

DESCRIPTION OF THE PREFERRED EMBODIMENT

Figure 1:
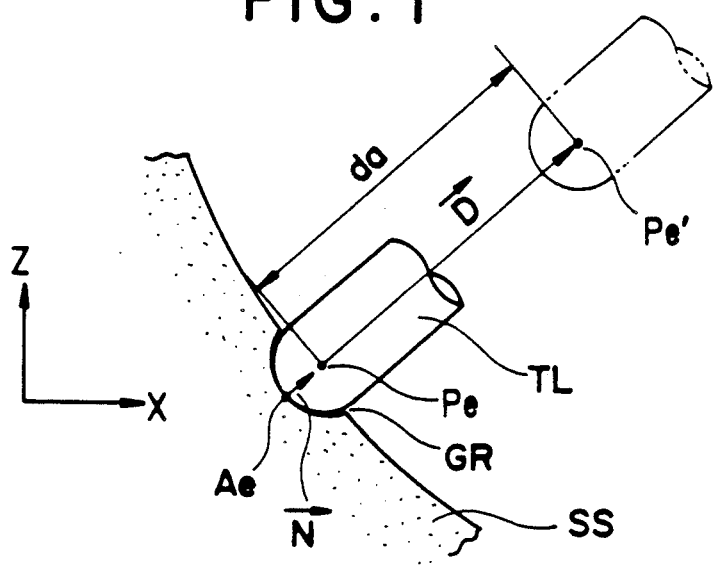
FIG. 1 is a schematic explanatory view of a method according to the present invention.
Figure 8:
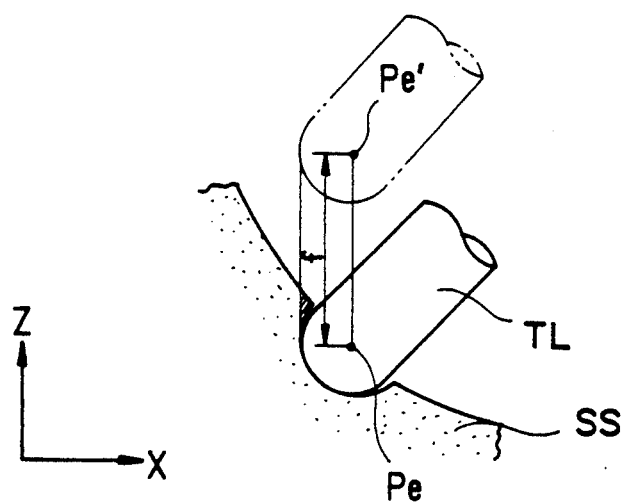
FIG. 8 is an explanatory view of a prior-art method.

FIG. 1 is a schematic explanatory view of a method according to the present invention, in which SS denotes a three-dimensional curved surface, GR a groove, Pe a position at which grooving ends, TL a tool, Ae a tool nose point corresponding to the grooving end point Pe, Pe' a withdrawal point, da a distance along which the tool is moved from the grooving end point Pe to the withdrawal point Pe', N unit normal vector at the point Pe, and D a movement vector for movement from the grooving end point Pe to the withdrawal point Pe'.

Figure 2:
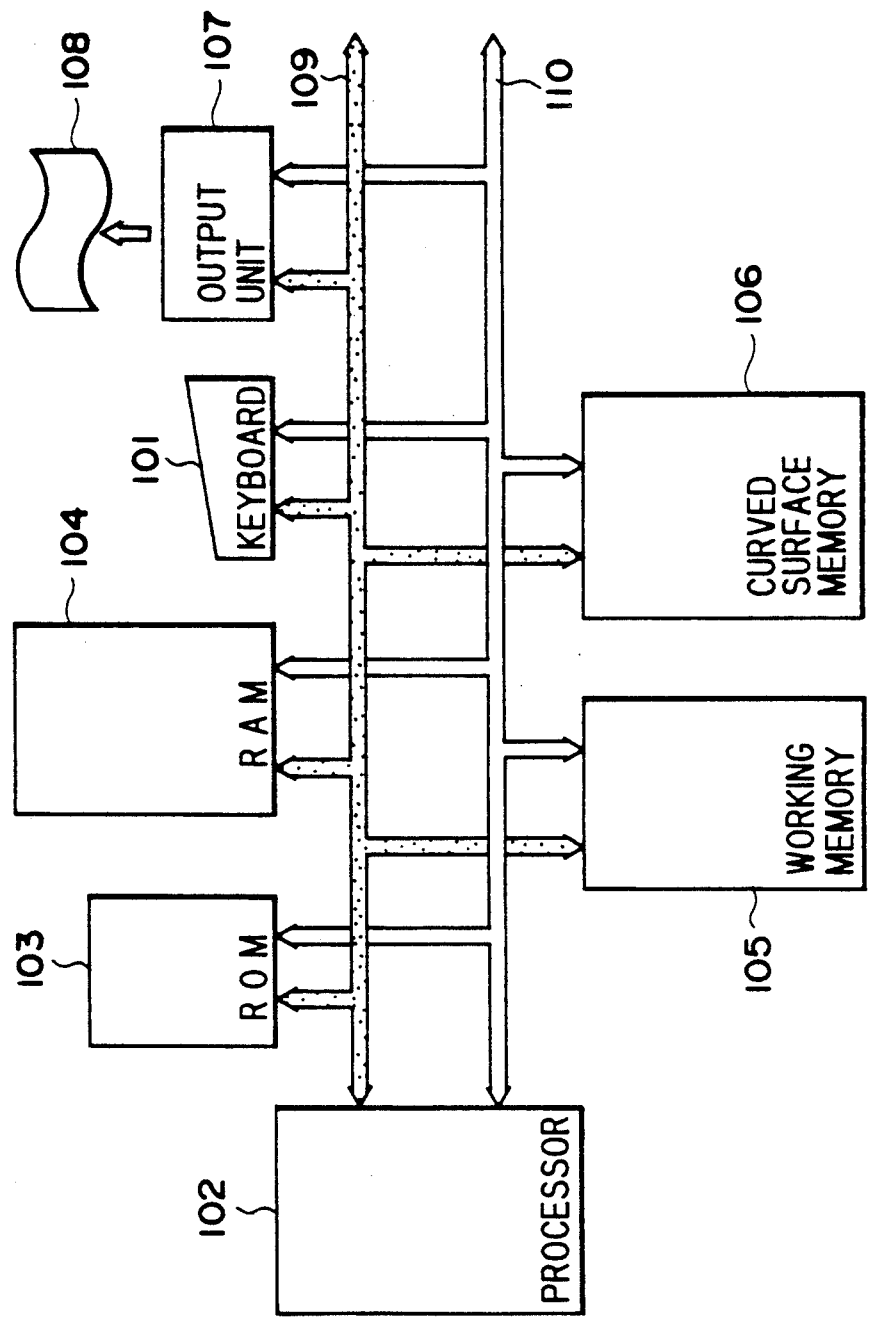
FIG. 2 is a block diagram of an apparatus for practicing a method according to the invention.

FIG. 2 is a block diagram of an automatic programming apparatus for practicing a method according to the present invention. Numeral 101 denotes a keyboard for data input, 102 a processor, 103 a ROM for storing a control program, 104 a RAM, 105 a working memory, 106 a curved-surface memory for storing grid points of meshes MS specifying the curved surface SS (see FIG. 4), unit normal vectors at the grid points, and NC program data for the curved surface and grooving machining, 107 an output unit for outputting, to an external storage medium 108 such as a paper tape or magnetic tape, created curved surface data or NC program data for curved surface or grooving machining, 109 an address bus, and 110 a data bus.

Figure 3:
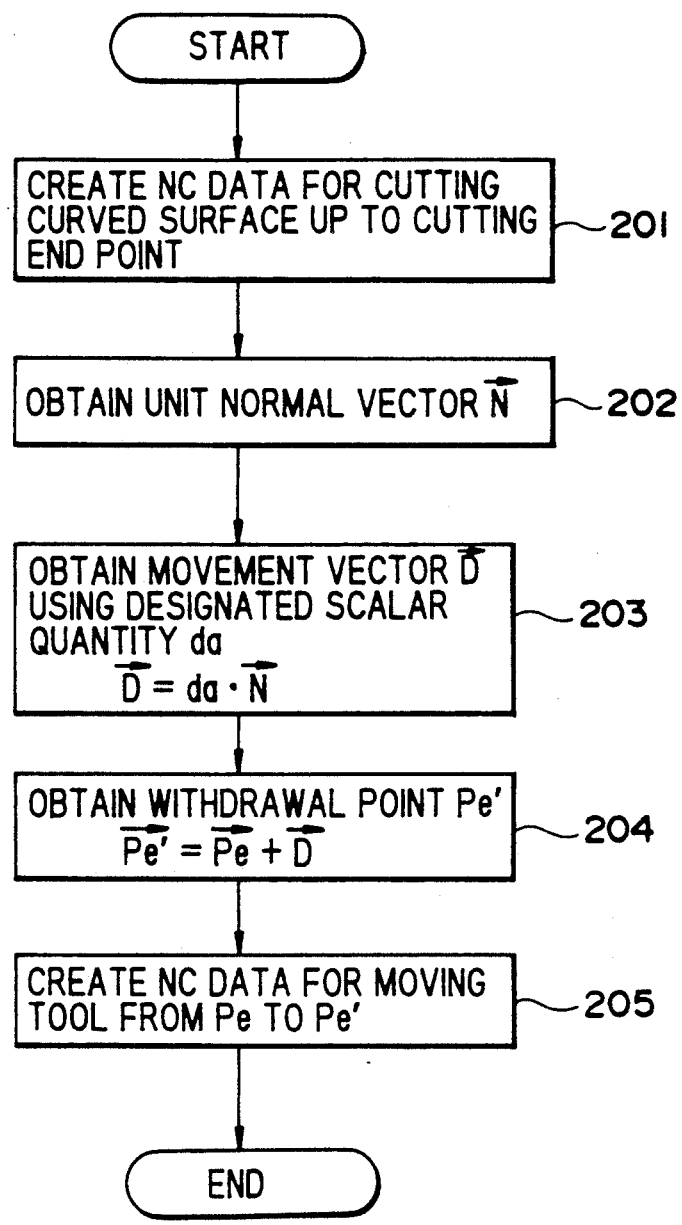
FIG. 3 is a flowchart of processing according to a method of the invention.
Figure 4:
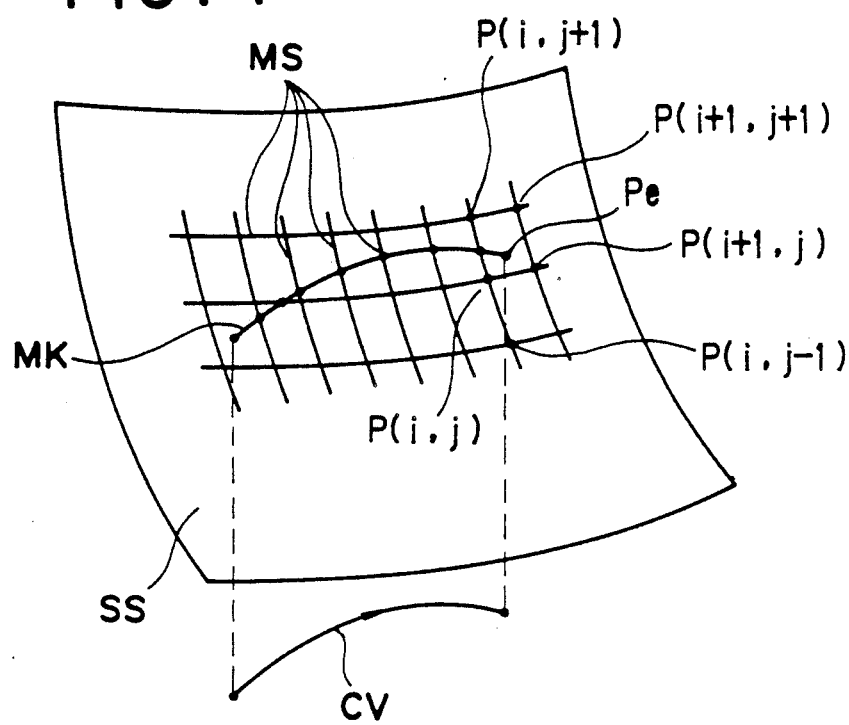
FIG. 4 is an explanatory view of a groove in a three-dimensional curved surface.
Figure 5:
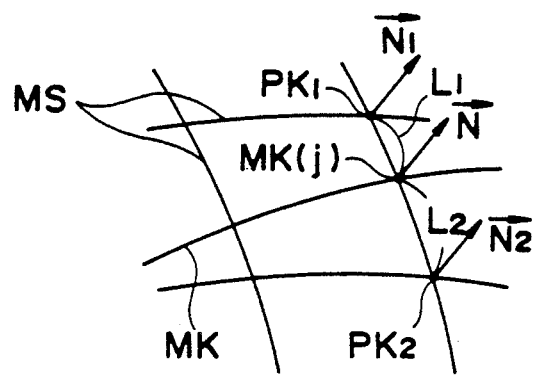
FIGS. 5 through 7 are explanatory views of a method of computing a normal vector according to the invention.
Figure 6:
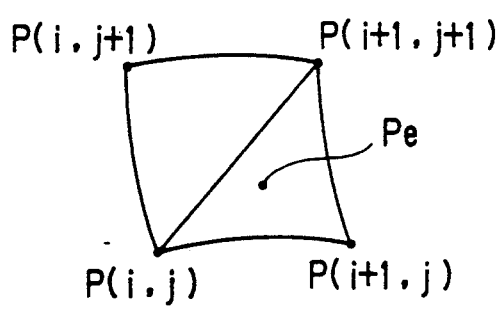
Figure 7:
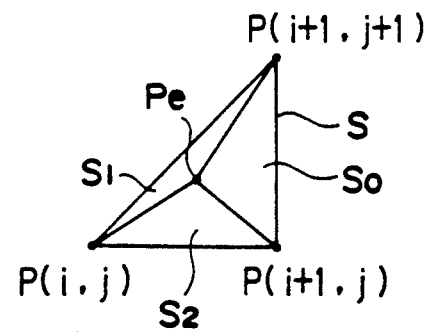

FIG. 3 is a flowchart of processing for creating NC data for grooving in accordance with the present invention, FIG. 4 is a view for describing a groove in a three-dimensional curved surface, and FIGS. 5 through 7 are explanatory views of a method of computing a normal vector. A method of the present invention will now be described in accordance with the flowchart of FIG. 3. In FIG. 4, MK represents a groove curve for specifying a groove on the three-dimensional curved surface. The groove curve MK is obtained as a result of projecting a planar curve CV, which is given on an X-Y plane, onto the curved surface SS. The groove curve MK is actually expressed as a point sequence composed of points of intersection between the meshes MS of the curved surface SS and the curve obtained by projecting the curve CV. It is assumed that position data indicative of each point on the sequence have already been stored in the RAM 104. As for the method of computing the groove curve, refer to FIGS. 5 and 6 in the specification of International Application No. PCT/JP88/00159 (filed on Feb. 17, 1988 and entitled "Method of Creating Curved Surfaces"). It is also assumed that the tool movement distance da and groove depth h at the grooving end point have already been entered from the keyboard 101.

NC data are created for moving the tool TL to the grooving end point Pe (FIG. 4) along the groove curve MK (step 201). The tool TL is, for example, capable of being controlled simultaneously along five axes, namely an X axis, Y axis, Z axis, horizontal rotational axis (B axis) and vertical rotational axis (C axis). NC data for simultaneous five-axis control are created in such a manner that the vector of the central axis of the tool will point in the direction of the normal line of the workpiece at each point constituting the groove curve (point sequence) MK.

More specifically, letting the N1, N2 represent the normal vectors at mesh grid points Pk1, Pk2, as shown in FIG. 5, a normal vector N at a point MK(j) constituting the groove curve is given by $N = N2 + (N1 - N2) \cdot L2/(L1 + L2)$. On the basis of the normal vector N (let the components thereof along the respective axes be i, j, and k), tool length L and tool nose position (X,Y,Z), the position (x,y,z) of the center of rotation of the tool and the positions (b,c) of horizontal and vertical rotation are computed in accordance with the following well-known computation formulae:

$$x = X + L \cdot i$$

$$y = Y + L \cdot j$$

$$z = Z + L \cdot k$$

$$b = \tan^{-1}(\sqrt{i^2 + j^2}/k)$$

$$c = \tan^{-1}(j/i)$$

The NC data for simultaneous five-axis control are created using x, y, z, b and c. The tool nose position is commanded by the NC data to a depth h in the normal direction from a point on the groove curve MK.

When the processor 102 ends creation of NC data up to the grooving end point Pe (FIG. 1), the processor calls the point Pe from the RAM 104 and obtains the unit vector N at the point Pe (step 202). The unit vector N at the grooving end point Pe is obtained through the following procedure described with reference to FIGS. 6 and 7:

(1) Mesh grid points P(i,j), P(i+1,j), P(i,j+1), P(i+1,j+1) which include the grooving end point Pe are obtained from the curved surface memory 106.

(2) From the aforementioned four points, the points P(i,j), P(i+1,j), P(i+1,j+1), which constitute a triangle that includes the grooving end point Pe, are selected (see FIG. 6).

(3) Let S represent the area of the triangle including the grooving end point Pe, and let S0, S1, S2 represent the areas of the triangles each of which has the grooving end point Pe as an apex, as shown in FIG. 7. The unit normal vector N at the grooving end point Pe is obtained in accordance with the following equation:

$$N = S0 \cdot N(i,j)/S + S1 \cdot N(i+1,j)/S + S2 \cdot N(i+1,j+1)/S$$

using unit normal vectors N(i,j), N(i+1,j), N(i+1,j+1) corresponding to the points P(i,j), P(i+1,j), P(i+1,j+1) called from the curved surface memory 106.

Next, the processor 102 uses the unit normal vector N and the already entered movement distance da to obtain the movement vector D in accordance with the following equation (step 203):

$$D = da \cdot N$$

and then uses the position vector Pe the grooving end point and the movement vector D obtain the position vector Pe' the withdrawal point in accordance with the following equation (step 204):

$$Pe' = Pe + D$$

Thereafter, the position vector Pe' of the withdrawal point is used to create NC data for moving the tool TL from the grooving end point Pe to the withdrawal point Pe' (step 205).

Thus, in accordance with the present invention, the arrangement is such that a unit normal vector at the position of a grooving end point is obtained, a movement vector is obtained by multiplying a designated distance by the unit normal vector, and NC data for withdrawal are created for moving a tool, by the amount of the movement vector, from the position at which grooving ends. As a result, it is possible to simply create NC data which will not cause cut-away at withdrawal of a tool.

We claim:

1. A method of using a memory and a processor for creating NC data which is used to perform grooving by moving a tool along a cutting groove curve on a three-dimensional surface and by withdrawing the tool a designated distance from the three-dimensional surface at an end point of grooving, comprising the steps of:

storing in the memory surface data including the three-dimensional surface and curve data including the cutting groove curve;

creating grooving NC data in the processor for performing grooving machining based upon the stored surface data and the curve data;

calculating in the processor a unit normal vector at the end point;

calculating in the processor a movement vector by multiplying the designated distance by said unit normal vector; and creating withdrawal NC in the processor for withdrawing the tool from the end part of grooving, based upon said movement vector.

2. A method according to claim 1, further comprising the step of:

computing in the processor the cutting groove curve by projecting a two-dimensional curve onto the three-dimensional surface.

3. A grooving NC data creation method according to claim 2, further comprising the steps of:

partitioning in the processor the three-dimensional surface by meshes, and computing in the processor said data of the cutting groove curve by calculating points of intersection between the cutting groove curve and said meshes.

4. A method according to claim 1, further comprising the step of:

partitioning in the processor the three-dimensional surface by meshes that intersect at grid points; and said step of calculating said unit normal vector includes the sub-steps of:

determining four of said grid points which enclose the end point, determining three grid points from among said four grid points that define a triangle which encloses the end point, said three grid points having respective normal vectors N0, N1 and N2;

dividing said triangle into three sub-triangles each having the end point as an apex;

calculating an area S of said triangle and respective areas S0, S1, S2 of said three-sub-triangles; and calculating the following equation for said unit normal vector N at the end point:

$$N = S0 \cdot N0/S + S1 \cdot N1/S + S2 \cdot N2/S.$$

5. A method using a memory and a processor for creating withdrawal NC data which is used to withdraw a grooving tool a designated distance from a three-dimensional surface when the grooving tool reaches a grooving end point after cutting a groove into the three-dimensional surface, comprising the steps of:

(a) storing in the memory the designated distance, surface data including the three-dimensional surface and grooving data including the grooving end point;

(b) calculating in the processor a normal movement vector at the grooving end point, based upon said grooving data, surface data and the designated distance; and (c) creating withdrawal NC data in the processor for withdrawing the grooving tool, based upon said normal movement vector.

6. A method as recited in claim 5, wherein step (b) includes the substep of:

(i) calculating a unit normal vector at the grooving end point, based upon said surface data and said grooving data.

7. A method as recited in claim 6, further comprising the step of:

partitioning in the processor the three-dimensional surface into meshes that intersect at grid points; and sub-step (i) further includes the sub-steps of:

determining three of said grid points that define a triangle which encloses the grooving end point, said three grid points having respective normal vectors N0, N1 and N2;

dividing said triangle into three sub-triangles each having the grooving end point as an apex;

calculating an area S of said triangle and respective areas S0, S1 and S2 of said three sub-triangles; and calculating the following equation for said unit normal vector N at the end point:

$$N = S0*N0/S + S1*N1/S + S2*N2/S.$$

8. An apparatus for creating withdrawal NC data which is used to withdraw a grooving tool a designated distance from a three-dimensional surface when the grooving tool reaches a grooving end point after cutting a groove into the three-dimensional surface, comprising:

means for storing the designated distance, surface data including the three-dimensional surface and grooving data including the grooving end point;

means for calculating a normal movement vector at the grooving end point, based upon said surface data, grooving data and the designated distance; and means for creating withdrawal NC data for withdrawing the grooving tool, based upon said normal movement vector.

* * * * *